Figure 1:
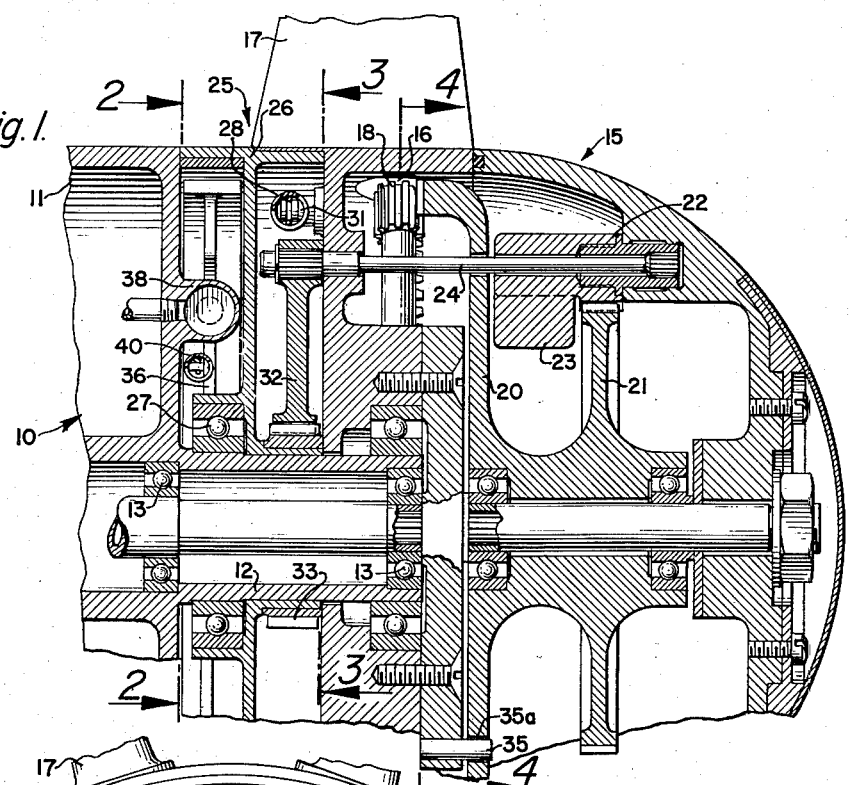

Feb. 7, 1961

D. K. BREAUX ET AL 2,970,652

CONTROL MECHANISM FOR RAM AIR TURBINE

Filed Jan. 10, 1957

2 Sheets-Sheet 1

ROBERT M. BELANUS,
DARLTON K. BREAUX,
INVENTORS.

BY John H. J. Wallace

Feb. 7, 1961  D. K. BREAUX ET AL  2,970,652
CONTROL MECHANISM FOR RAM AIR TURBINE
Filed Jan. 10, 1957  2 Sheets-Sheet 2

ROBERT M. BELANUS,
DARLTON K. BREAUX,
INVENTORS.

BY John M. Wallace

United States Patent Office 2,970,652
Patented Feb. 7, 1961

2,970,652

CONTROL MECHANISM FOR RAM AIR TURBINE

Darlton K. Breaux, Torrance, and Robert M. Belanus, Los Angeles, Calif., assignors to The Garrett Corporation, Los Angeles, Calif., a corporation of California Filed Jan. 10, 1957, Ser. No. 633,421

3 Claims. (Cl. 170—68)

This invention relates generally to auxiliary or emergency power units for use on aircraft to generate electrical or hydraulic power; the invention is more particularly directed to ram air turbines of the type having a blade assembly, supported in an airstream to effect its rotation, and a governor mechanism responsive to centrifugal force, due to the rotation of the blade assembly, to adjust the pitch of the blades whereby the blade assembly will be caused to rotate at a selected rate irrespective of the speed of the airstream, or the supporting aircraft therein, above a predetermined minimum.

In some aircraft, ram air turbines of the type mentioned in the preceding paragraph are mounted on retractable supports which may be projected into the airstream when it is desired to use the turbines and retracted when the use is no longer required. In other installations, however, the turbines must be carried in positions where they are continuously exposed to the airstream. Not infrequently it is desired to have such turbines remain inoperative, i.e., the blade assembly stationary or nonrotating, at the will of the aircraft pilot. It is an object of this invention to provide a ram air turbine having means by which the blade assembly will be held stationary and the pitch of the blades thereof so adjusted that the airstream will have little or no tendency to effect the rotation of the blade assembly.

Another object of this invention is to provide a ram air turbine of the type having a rotatable blade assembly and governor mechanism, which latter is responsive to centrifugal force to feather the blades to cause the blade assembly to rotate at a desired speed, the turbine also being provided with apparatus for applying a braking force to the blade assembly and another force, developed as a result of the braking force, to adjust the blades toward a fully feathered position so that the tendency of the airstream to rotate the blade assembly will be reduced to a minimum.

An object of the invention also is to provide a ram air turbine of the type above-referred to, with a first element, designated as a brake drum, mounted on the blade assembly to rotate therewith and to a limited extent relative thereto, and one or more second elements, which may be designated as brake shoes, mounted on the support for the blade assembly in a nonrotatable manner, means being provided to move the brake shoes into engagement with the drum to oppose rotation thereof whereby the inertia and/or torque of the blade assembly will cause relative movement between it and the brake drum, the mechanism being provided with motion transmitting means which are operative to cause feathering movement of the blades when relative movement between the blade assembly and the brake drum occurs, sufficient feathering movement of the blades being caused to make the blade assembly substantially unresponsive to the force of the airstream.

A further object of the invention is to provide a ram air turbine having the first and second elements as set forth in the preceding paragraph with means urging the first element or brake drum toward a predetermined position relative to the blade assembly, such means being yieldable to permit relative movement in response to the inertia and/or torque of the blade assembly, the motion transmitting means being responsive to such relative movement to feather the blades. When the force tending to continue the rotation of the blade assembly is dissipated the yieldable urging means tends to return the blade assembly to the predetermined position relative to the brake drum, this movement tending to change the angle of the blade to the initial pitch. The force of the airstream on the blades, however, imparts torque to the blade assembly which continues to urge the blades toward feathered positions.

Other objects and advantages will be apparent from the following description of one embodiment of the invention illustrated in detail in the accompanying drawings.

Figure 2:
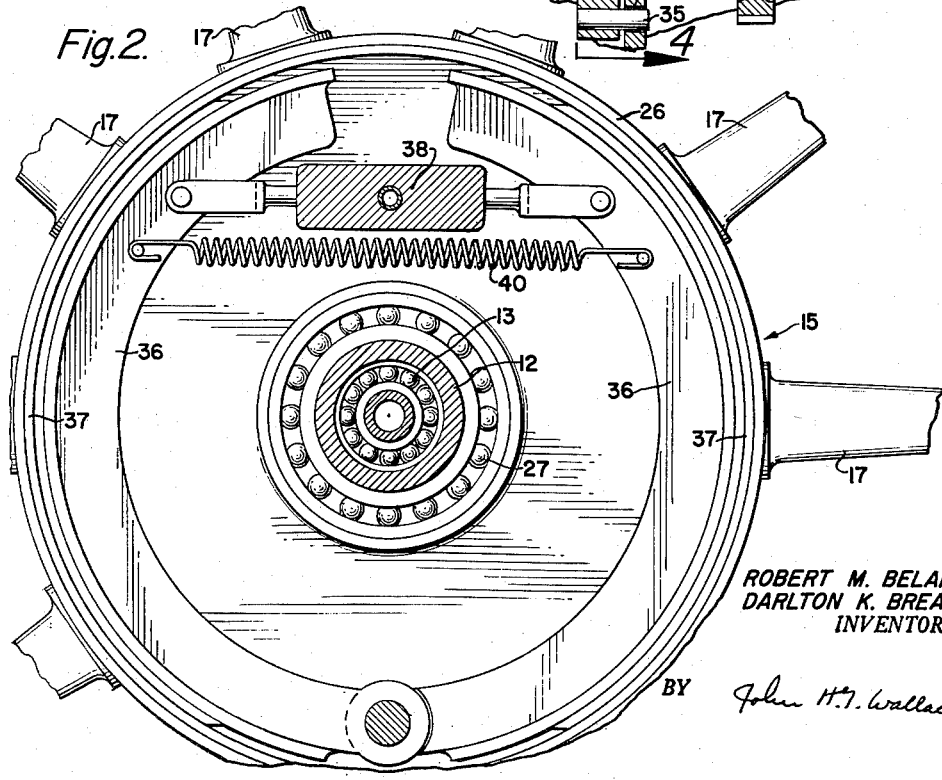
Figure 3:
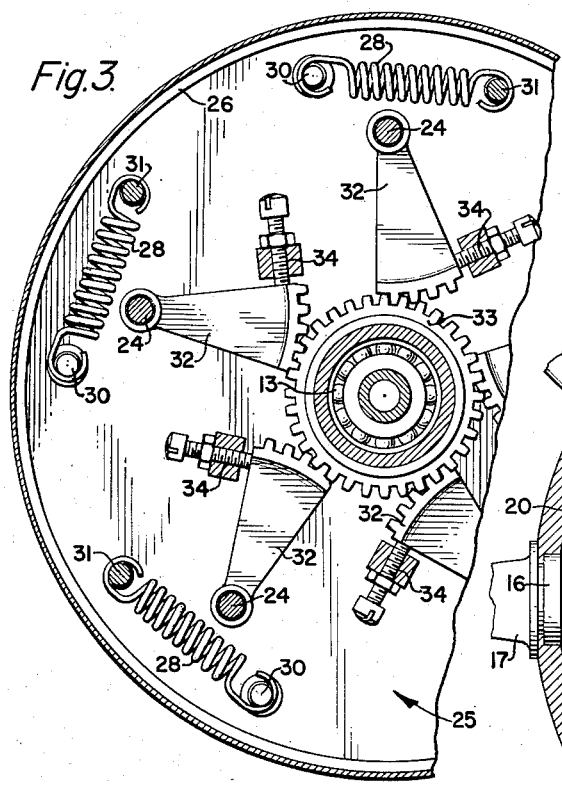
Figure 4:
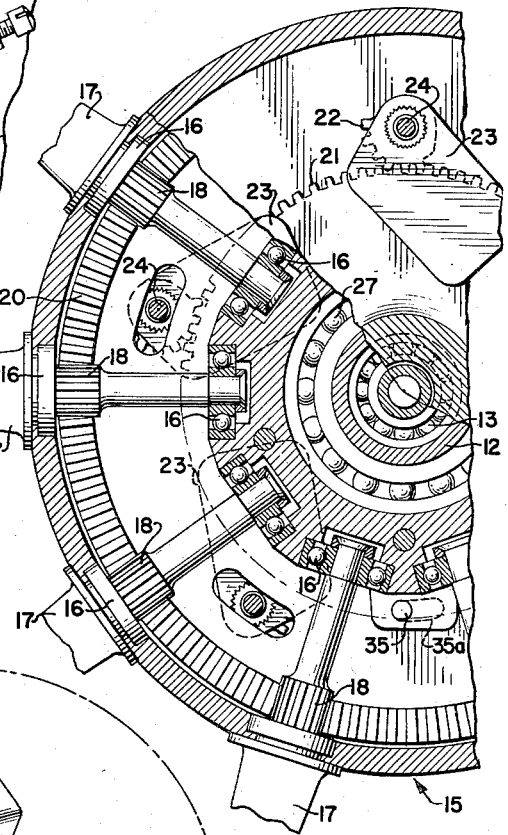
Figure 5:
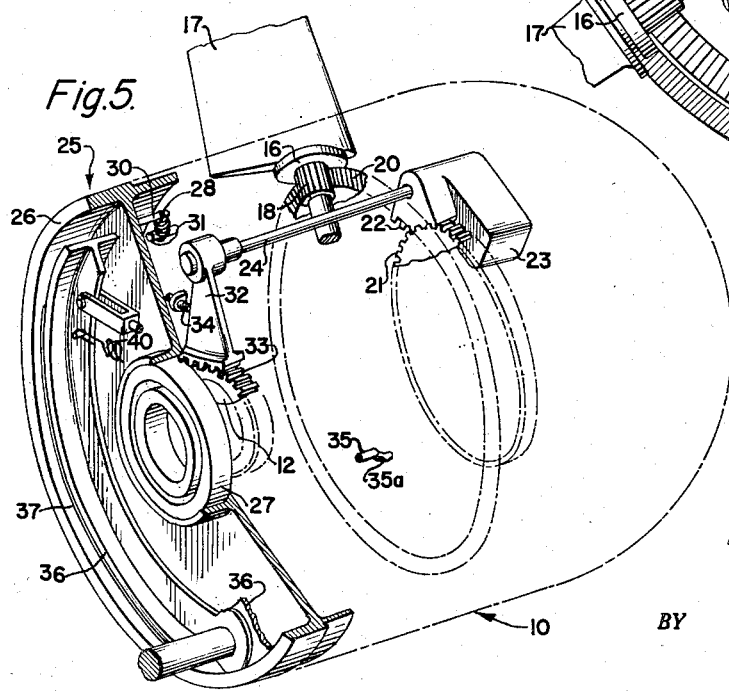

In the drawings:

Fig. 1 is a fragmentary axial sectional view taken through a ram air turbine formed in accordance with the present invention;

Figs. 2, 3, and 4 are vertical transverse sectional views taken on the planes indicated by the lines 2—2, 3—3, and 4—4, respectively, of Fig. 1;

Fig. 5 is a schematic perspective view showing a single blade of the ram air turbine with the applicable portions of the governing mechanism and the feathering mechanism formed in accordance with the invention applied thereto.

Referring more particularly to the drawings, the numeral 10 designates generally the ram air turbine to which the invention is applied. This turbine includes a housing 11 which may be suitably supported on an airplane or other machine requiring an auxiliary power unit. Housing 11 may be of any suitable form, the one illustrated including a tubular portion with a forwardly projecting boss 12 for the reception of bearings 13, these bearings rotatably supporting a blade and governor assembly indicated generally by the numeral 15. The blade and governor assembly includes a rotatable frame having bearings 16 for supporting blades 17 for rotation about axes extending radially from the axis of rotation of the blade and governor assembly.

Blades 17 are provided with pinions 18 which are disposed in meshing engagement with a ring or face gear 20, this member being supported for rotary movement about the axis of rotation of the blade and governor assembly. The face gear includes a spur gear 21 which is disposed in meshing engagement with segments 22 which, in the present form of the invention, are integral with flyweight elements 23, these elements each being secured to the forward end of a torsion bar 24. These torsion bars are disposed in parallel relationship with and eccentric to the axis of rotation of the blade and governor assembly. As will be obvious from the foregoing considered in connection with the accompanying drawings, rotary motion of the turbine imparts centrifugal force to the flyweights and causes these elements to swing about the axes of the torsion bars, the rear ends of which are secured against rotation by means which will be described in detail hereinafter. As the flyweights revolve due to centrifugal action, the segments 22 impart rotary movement to the face gear which, in turn, causes rotary adjustment of the blades in a feathering direction. Due to this feathering adjustment, the response of the blades to the force of the ram air will be diminished and the speed of rotation of the turbine will be prevented from increasing. If the ram air speed decreases and the rotary speed of the turbine tends to decrease, the torsion bars 24 will swing the flyweights inwardly causing the segments 22 to turn the face gear and pinions 18 in the opposite direction and increase the pitch of the blades 17. This adjustment will tend to increase the response of the blades to the ram air force and thus overcome the tendency of the turbine speed to decrease. The speed of rotation of the turbine is thus controlled. The turbine thus far described is substantially identical in construction and operation with certain turbines now available on the market.

As pointed out in the objects, this invention is directed to apparatus for selectively feathering the blades and interrupting the operation of the turbine. Such apparatus includes an assembly 25 generally termed a brake mechanism. This mechanism comprises a brake drum 26 supported on the boss 12 by bearings 27 for movement in unison with and relative to the blade and governor assembly 15. The brake drum is urged toward a certain rotary position relative to the governor assembly by a plurality of coil springs 28 each of which has one end secured to a pin 30 projecting from the brake drum and the opposite end connected with another pin 31 projecting from the governor assembly. The latter assembly is also provided with a plurality of gear segments 32, each being secured to the forward end of a torsion bar 24. The teeth of the segments 32 are disposed in meshing engagement with a gear 33 formed with the brake drum 26. Tension of the springs 28 tends to urge the brake drum in one direction which, in turn, causes the segments to move toward adjustable stop screws 34 carried by the governor mechanism.

When the segments are in engagement with the stop screws, the brake drum will be disposed in a predetermined position of rotation relative to the governor. In this position, the forward ends of the torsion bars are held against rotation. Through the adjustment of the screws 34 the initial torsion of the bars 24 may be determined. This initial torsion will tend to rotate the face gear through the engagement of segments 22 and spur gear 21 until the end of a slot 35a in the face gear 20 engages a stop pin 35. The rotation of the face gear also adjusts the blades 17 to the predetermined initial pitch. As previously pointed out, ram air striking the blades will impart rotary movement to the blade and governor assembly and the centrifugal force of the flyweights will cause feathering adjustment of the blades to control the rate of rotary movement of the governor and blade assembly. This feathering movement imparts additional torsion to the bars 24 which force will return the blades toward their initial setting as the rate of rotation of the blade and governor assembly is decreased.

To move the blades toward a full feathered position and discontinue the rotation of the blade and governor assembly, the brake assembly is provided with a plurality of brake shoes 36, these elements being mounted for adjustment on one or more pivots projecting from the frame 11. The brake shoes are disposed within the brake drum and have brake lining 37 secured thereto, such lining being of suitable type to frictionally engage and apply a braking force to the brake drum. Housing 11 is provided with a hydraulic cylinder 38 of double-acting type for moving the brake shoes into engagement with the brake drum. This action is opposed by a spring 40 secured at its ends to the brake shoes. Under normal conditions the spring 40 maintains the brake shoes spaced from the drum so that this latter element may rotate in unison with the blade and governor assembly.

When it is desired to move the blades toward a full feathered position and stop the rotation of the blade and governor assembly, hydraulic fluid is introduced to the cylinder 38 to cause the shoes to move into engagement with the brake drum. As the shoes are so engaged, friction will be applied to the drum to oppose rotary movement thereof. When the friction is initially applied, the inertia and/or torque of the blade and governor assembly will tend to continue the rotation thereof. At this time the blade and governor assembly will move relative to the brake drum in opposition to the force applied by the springs 28. This relative movement will be transmitted through the segments 32 to the torsion bars 24 causing these elements to rotate in the same direction as the force imparted by the flyweights, this movement being transmitted by the gear segments 22, the spur gear 21, and face gear 20 to the blades to move them in a feathering direction. When so moved, the tendency of the ram air to impart rotary movement to the blade and turbine assembly will be minimized. The friction applied by the brake shoes to the brake drum will then interrupt the rotation of the blade and governor assembly. When the inertia of the governor mechanism is spent, the springs 28 will tend to return the governor assembly to its initial rotary position relative to the brake drum. This motion will tend to return the blades 17 to their initial pitch and the ram air will then be effective to again impart a rotary tendency to the blade and governor assembly. This motion will again tend to cause relative movement between the brake and the governor assembly in opposition to the force of the springs 28. The blade and governor assembly will soon reach an equilibrium point at which the torsion imparted by the ram air reacting against the blades 17 equals the force of the springs 28.

When it is desired to place the turbine in operation once more, the hydraulic force applied to the cylinder 38 will be relieved permitting the brake shoes to move away from the brake drum, and the springs 28 will then restore the brake drum and governor assembly to their initial relative position in which the initial torsion will be reapplied to the bars 24 and the blades 17 will then be in their positions of initial pitch. The degree of movement of the blades 17 toward a feathered position will be determined by the length of the slot 35a in the face gear 20.

It will be noted that the pre-load of springs 28 will be sufficient during normal operation of the device to maintain gear segments 32 against stop screws 34. During the operation of the governor mechanism these springs will only permit relative movement between the brake drum and the governor assembly when the former is engaged by the brake shoe and the blades 17 are exposed to ram air force.

We claim:

1. In a ram air turbine, a rotatable blade assembly having governor means disposed thereon, said governor means being responsive to centrifugal force to feather the blades on said blade assembly to limit the latter to a predetermined speed of rotation, said governor means having torsion means normally tending to oppose the centrifugal force and maintain said blades at an initial pitch; first means disposed on said turbine for relieving said governor means of control and interrupting the rotation of said blade assembly, said first means having a first element rotatable with and relative to said blade assembly; a second element supported against rotation, said second element being movable to engage said first element and resist rotary movement thereof, the tendency of said blade assembly to continue to rotate causing movement thereof relative to said element; and second means mounted on said first means and responsive to such relative movement between said blade assembly and said first element to move the torsion means of said governor means in the same direction as the centrifugal force to feather said blades to a predetermined degree.

2. In a ram air turbine, a rotatable blade assembly having governor means disposed thereon, said governor means being responsive to centrifugal force to feather the blades on said blade assembly to limit the latter to a predetermined speed of rotation, said governor means having torsion means normally tending to oppose the centrifugal force and maintain said blades at an initial pitch; first means disposed on said turbine for relieving said governor means of control and interrupting the rotation of said blade assembly, said first means having a first element rotatable with and relative to said blade assembly; resilient means tending to maintain said first element in a predetermined position relative to said blade assembly; a second element supported against rotation, said second element being movable to engage said first element and resist rotary movement thereof, the tendency of said blade assembly to continue to rotate causing movement thereof relative to said element; and second means mounted on said first means and responsive to such relative movement between said blade assembly and said first element to move the torsion means of said governor means in the same direction as the centrifugal force to feather said blades to a predetermined degree, said resilient means returning said first element to said predetermined position and said blades toward initial pitch when said second element is disengaged from said first element.

3. In a ram air turbine, a rotatable blade assembly having governor means disposed thereon, said governor means being responsive to centrifugal force to feather the blades on said blade assembly to limit the latter to a predetermined maximum speed of rotation, said governor means having flyweight means and torsion means opposing the centrifugal force of the flyweight means, said torsion means tending to move said blades to an initial pitch; first means disposed on said turbine for relieving said governor means of control and interrupting the rotation of said blade assembly, said first means having a first element rotatable with and relative to said blade assembly; a second element held against rotation, said second element being movable to engage said first element and resist rotary movement thereof, the inertia of said blade assembly causing relative movement between it and said first element; second means mounted on said first means and responsive to such relative movement between said blade assembly and said first element to relieve said torsion means of the tendency to adjust said blades to the initial pitch and move the same in the same direction as the centrifugal force of said flyweight means; and third means operative when said second element is disengaged from said first element to restore to said torsion means the tendency to move said blades to said initial pitch.

References Cited in the file of this patent

UNITED STATES PATENTS

| 564,927 | Henry | July 28, 1896 |
| 772,052 | Perry | Oct. 11, 1904 |
| 2,777,524 | Chapman et al. | June 15, 1957 |